United States Patent
Yoo et al.

(10) Patent No.: US 10,333,448 B2
(45) Date of Patent: Jun. 25, 2019

(54) METHOD FOR TORQUE CONTROL SYSTEMS AND METHODS BASED ON ROTOR TEMPERATURE

(71) Applicant: GM Global Technology Operations LLC, Detroit, MI (US)

(72) Inventors: Anno Yoo, Rochester Hills, MI (US); Yo Chan Son, Rochester Hills, MI (US); Sangyeop Kwak, Orion Charter Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/482,935

(22) Filed: Apr. 10, 2017

(65) Prior Publication Data

US 2018/0294756 A1 Oct. 11, 2018

(51) Int. Cl.
| | |
|---|---|
| *H02P 21/14* | (2016.01) |
| *H02P 21/22* | (2016.01) |
| *H02P 21/24* | (2016.01) |
| *H02P 21/26* | (2016.01) |
| *H02P 27/08* | (2006.01) |
| *H02P 29/66* | (2016.01) |
| *B60L 11/18* | (2006.01) |

(52) U.S. Cl.
CPC .......... *H02P 21/24* (2016.02); *B60L 11/1803* (2013.01); *H02P 21/14* (2013.01); *H02P 21/22* (2016.02); *H02P 21/26* (2016.02); *H02P 27/08* (2013.01); *H02P 29/66* (2016.02); *B60L 2240/423* (2013.01); *B60L 2260/56* (2013.01); *Y02T 10/642* (2013.01); *Y02T 10/7005* (2013.01); *Y02T 10/7241* (2013.01); *Y02T 10/7275* (2013.01)

(58) Field of Classification Search
CPC .......... H02P 21/22; H02P 21/24; H02P 29/66; B60L 11/1808
USPC .......................................... 318/473
See application file for complete search history.

(56) References Cited

U.S. PATENT DOCUMENTS

| | | | | |
|---|---|---|---|---|
| 5,218,282 | A * | 6/1993 | Duhame | H02H 7/0851 318/434 |
| 9,166,518 | B2 | 10/2015 | Campbell et al. | |
| 2007/0205732 | A1* | 9/2007 | Beifus | F04D 27/004 318/432 |
| 2011/0077810 | A1* | 3/2011 | Katou | B60W 10/108 701/22 |

(Continued)

*Primary Examiner* — Eduardo Colon Santana
*Assistant Examiner* — Devon A Joseph

(57) ABSTRACT

An electric motor control system of a vehicle includes a current command module configured to, based on a motor torque request for an electric motor of the vehicle, generate a first d-axis current command for the electric motor and a first q-axis current command for the electric motor. An adjustment module is configured to, based on a speed of a rotor of the electric motor and the motor torque request, selectively determine at least one of a d-axis current adjustment and a q-axis current adjustment based on a temperature of the rotor of the electric motor. An adjusting module is configured to produce a second d-axis current command for the electric motor by adjusting the first d-axis current command based on the d-axis current adjustment and to produce a second q-axis current command for the electric motor by adjusting the first q-axis current command based on the q-axis current adjustment.

16 Claims, 6 Drawing Sheets

(56) References Cited

U.S. PATENT DOCUMENTS

| | | | | |
|---|---|---|---|---|
| 2012/0212169 A1* | 8/2012 | Wu | ............... | H02P 7/285 |
| | | | | 318/432 |
| 2012/0217908 A1* | 8/2012 | Wu | ............... | H02P 21/04 |
| | | | | 318/400.02 |
| 2013/0316871 A1* | 11/2013 | Shiiba | ............ | B60W 10/08 |
| | | | | 477/15 |
| 2018/0056811 A1* | 3/2018 | Iwahana | .......... | B60L 15/20 |

* cited by examiner

METHOD FOR TORQUE CONTROL SYSTEMS AND METHODS BASED ON ROTOR TEMPERATURE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle propulsion systems and more particularly to systems and methods for controlling an electric motor of a vehicle based on a temperature of a rotor of the electric motor.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, an electric motor control system of a vehicle is described. A current command module is configured to, based on a motor torque request for an electric motor of the vehicle, generate a first d-axis current command for the electric motor and a first q-axis current command for the electric motor. An adjustment module is configured to, based on a speed of a rotor of the electric motor and the motor torque request, selectively determine at least one of a d-axis current adjustment and a q-axis current adjustment based on a temperature of the rotor of the electric motor. An adjusting module is configured to produce a second d-axis current command for the electric motor by adjusting the first d-axis current command based on the d-axis current adjustment and to produce a second q-axis current command for the electric motor by adjusting the first q-axis current command based on the q-axis current adjustment. A switching control module is configured to, based on the second d-axis current command and the second q-axis current command, control switching of an inverter module and apply power to stator windings of the electric motor from an energy storage device.

In further features, the adjustment module is configured to: when the speed is greater than a predetermined speed, set both the d-axis current adjustment and the q-axis current adjustment to a predetermined value; and when the speed is less than the predetermined speed, based on whether the motor torque request is greater than a predetermined torque, selectively determine one of the d-axis current adjustment and the q-axis current adjustment based on the temperature of the rotor of the electric motor; and the adjusting module is configured to: based on the d-axis current adjustment being equal to the predetermined value, set the second d-axis current command equal to the first d-axis current command; and based on the q-axis current adjustment being equal to the predetermined value, set the second q-axis current command equal to the first q-axis current command.

In further features, the adjusting module is configured to: based on the d-axis current adjustment being not equal to the predetermined value, one of increase and decrease the first d-axis current command based on the d-axis current adjustment to produce the second d-axis current command; and based on the q-axis current adjustment being not equal to the predetermined value, one of increase and decrease the first q-axis current command based on the q-axis current adjustment to produce the second q-axis current command.

In further features, the adjusting module is configured to one of: set the second d-axis current command equal to the first d-axis current command plus the d-axis current adjustment; and set the second d-axis current command equal to the first d-axis current command multiplied by the d-axis current adjustment; and one of: set the second q-axis current command equal to the first q-axis current command plus the q-axis current adjustment; and set the second d-axis current command equal to the first q-axis current command multiplied by the q-axis current adjustment.

In further features, the adjustment module is configured to: when the speed is less than the predetermined speed and the motor torque request is greater than the predetermined torque, determine the d-axis current adjustment based on the temperature of the rotor of the electric motor; and when the speed is less than the predetermined speed and the motor torque request is less than the predetermined torque, determine the q-axis current adjustment based on the temperature of the rotor of the electric motor.

In further features, the adjustment module is further configured to, when the speed is less than the predetermined speed and the motor torque request is greater than the predetermined torque, set the q-axis current adjustment to the predetermined value.

In further features, the adjustment module is further configured to, when the speed is less than the predetermined speed and the motor torque request is less than the predetermined torque, set the d-axis current adjustment to the predetermined value.

In further features, the adjustment module is further configured to, when the speed is less than the predetermined speed and the motor torque request is less than the predetermined torque, determine the d-axis current adjustment based on the first d-axis current command, a d-axis inductance of the electric motor, a q-axis inductance of the electric motor, and a predetermined gain.

In further features, the adjustment module is configured to, when the speed is less than the predetermined speed and the motor torque request is less than the predetermined torque: determine a magnetic flux linkage of the electric motor based on the temperature of the rotor; determine a variation in the magnetic flux linkage based on the temperature of the rotor; and determine the q-axis current adjustment based on the magnetic flux linkage and the variation in the magnetic flux linkage.

In further features, the adjustment module is configured to, when the speed is less than the predetermined speed and the motor torque request is greater than the predetermined torque: determine a variation in magnetic flux linkage of the electric motor based on the temperature of the rotor; and determine the d-axis current adjustment based on the variation in the magnetic flux linkage, a d-axis inductance of the electric motor, and a q-axis inductance of the electric motor.

In a feature, an electric motor control method for a vehicle includes: based on a motor torque request for an electric motor of the vehicle, generating a first d-axis current command for an electric motor of the vehicle and a first q-axis current command for the electric motor; based on a speed of a rotor of the electric motor and the motor torque request, selectively determining at least one of a d-axis current adjustment and a q-axis current adjustment based on a temperature of the rotor of the electric motor; producing a second d-axis current command for the electric motor by adjusting the first d-axis current command based on the d-axis current adjustment; producing a second q-axis current command for the electric motor by adjusting the first q-axis current command based on the q-axis current adjustment; and based on the second d-axis current command and the second q-axis current command, controlling switching of an inverter module and applying power to stator windings of the electric motor from an energy storage device.

In further features, selectively determining at least one of the d-axis current adjustment and the q-axis current adjustment includes: when the speed is greater than a predetermined speed, setting both the d-axis current adjustment and the q-axis current adjustment to a predetermined value; and when the speed is less than the predetermined speed, based on whether the motor torque request is greater than a predetermined torque, selectively determining one of the d-axis current adjustment and the q-axis current adjustment based on the temperature of the rotor of the electric motor; producing the second d-axis current command includes, based on the d-axis current adjustment being equal to the predetermined value, setting the second d-axis current command equal to the first d-axis current command; and producing the second q-axis current command includes, based on the q-axis current adjustment being equal to the predetermined value, setting the second q-axis current command equal to the first q-axis current command.

In further features: producing the second d-axis current command includes, based on the d-axis current adjustment being not equal to the predetermined value, one of increasing and decreasing the first d-axis current command based on the d-axis current adjustment to produce the second d-axis current command; and producing the second q-axis current command includes, based on the q-axis current adjustment being not equal to the predetermined value, one of increasing and decreasing the first q-axis current command based on the q-axis current adjustment to produce the second q-axis current command.

In further features, one of: producing the second d-axis current command includes setting the second d-axis current command equal to the first d-axis current command plus the d-axis current adjustment; and producing the second d-axis current command includes setting the second d-axis current command equal to the first d-axis current command multiplied by the d-axis current adjustment; and one of: producing the second q-axis current command includes setting the second q-axis current command equal to the first q-axis current command plus the q-axis current adjustment; and producing the second q-axis current command includes setting the second d-axis current command equal to the first q-axis current command multiplied by the q-axis current adjustment.

In further features, selectively determining at least one of the d-axis current adjustment and the q-axis current adjustment includes: when the speed is less than the predetermined speed and the motor torque request is greater than the predetermined torque, determining the d-axis current adjustment based on the temperature of the rotor of the electric motor; and when the speed is less than the predetermined speed and the motor torque request is less than the predetermined torque, determining the q-axis current adjustment based on the temperature of the rotor of the electric motor.

In further features, selectively determining at least one of the d-axis current adjustment and the q-axis current adjustment includes, when the speed is less than the predetermined speed and the motor torque request is greater than the predetermined torque, setting the q-axis current adjustment to the predetermined value.

In further features, selectively determining at least one of the d-axis current adjustment and the q-axis current adjustment includes, when the speed is less than the predetermined speed and the motor torque request is less than the predetermined torque, setting the d-axis current adjustment to the predetermined value.

In further features, selectively determining at least one of the d-axis current adjustment and the q-axis current adjustment includes, when the speed is less than the predetermined speed and the motor torque request is less than the predetermined torque, determining the d-axis current adjustment based on the first d-axis current command, a d-axis inductance of the electric motor, a q-axis inductance of the electric motor, and a predetermined gain.

In further features, selectively determining at least one of the d-axis current adjustment and the q-axis current adjustment includes, when the speed is less than the predetermined speed and the motor torque request is less than the predetermined torque: determining a magnetic flux linkage of the electric motor based on the temperature of the rotor; determining a variation in the magnetic flux linkage based on the temperature of the rotor; and determining the q-axis current adjustment based on the magnetic flux linkage and the variation in the magnetic flux linkage.

In further features, selectively determining at least one of the d-axis current adjustment and the q-axis current adjustment includes, when the speed is less than the predetermined speed and the motor torque request is greater than the predetermined torque: determining a variation in magnetic flux linkage of the electric motor based on the temperature of the rotor; and determining the d-axis current adjustment based on the variation in the magnetic flux linkage, a d-axis inductance of the electric motor, and a q-axis inductance of the electric motor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine of a vehicle combusts air and fuel within cylinders to generate propulsion torque. The engine outputs torque to wheels of the vehicle via a transmission. Some types of vehicles may not include an internal combustion engine or the internal combustion engine may not be mechanically coupled to a driveline of the vehicle.

An electric motor is mechanically coupled to a shaft of the transmission. Under some circumstances, a hybrid control module of the vehicle may apply power to the electric motor from a battery to cause the electric motor to output torque for vehicle propulsion. Under other circumstances, the hybrid control module may disable power flow to the electric motor and allow the transmission to drive rotation of the electric motor. The electric motor generates power when driven by the transmission. Power generated by the electric motor can be used to recharge the battery when a voltage generated via the electric motor is greater than a voltage of the battery.

The hybrid control module determines a d-axis current command and a q-axis current command for the electric motor based on a requested torque output of the electric motor. Torque output of the electric motor, however, may vary with temperature of the rotor of the electric motor. For example, torque output of the electric motor may decrease as rotor temperature increases and vice versa.

According to the present disclosure, the hybrid control module selectively adjusts at least one of the d-axis current command and the q-axis current command based on the rotor temperature. For example, the hybrid control module may adjust the d-axis current command based on the rotor temperature when a speed of the rotor is less than a predetermined speed and the requested torque output is greater than a predetermined torque. The hybrid control module may adjust the q-axis current command based on the rotor temperature when the speed of the rotor is less than the predetermined speed and the requested torque output is less than the predetermined torque. The adjustment helps minimize any difference between the actual torque output of the engine and the requested torque output.

Figure 1:
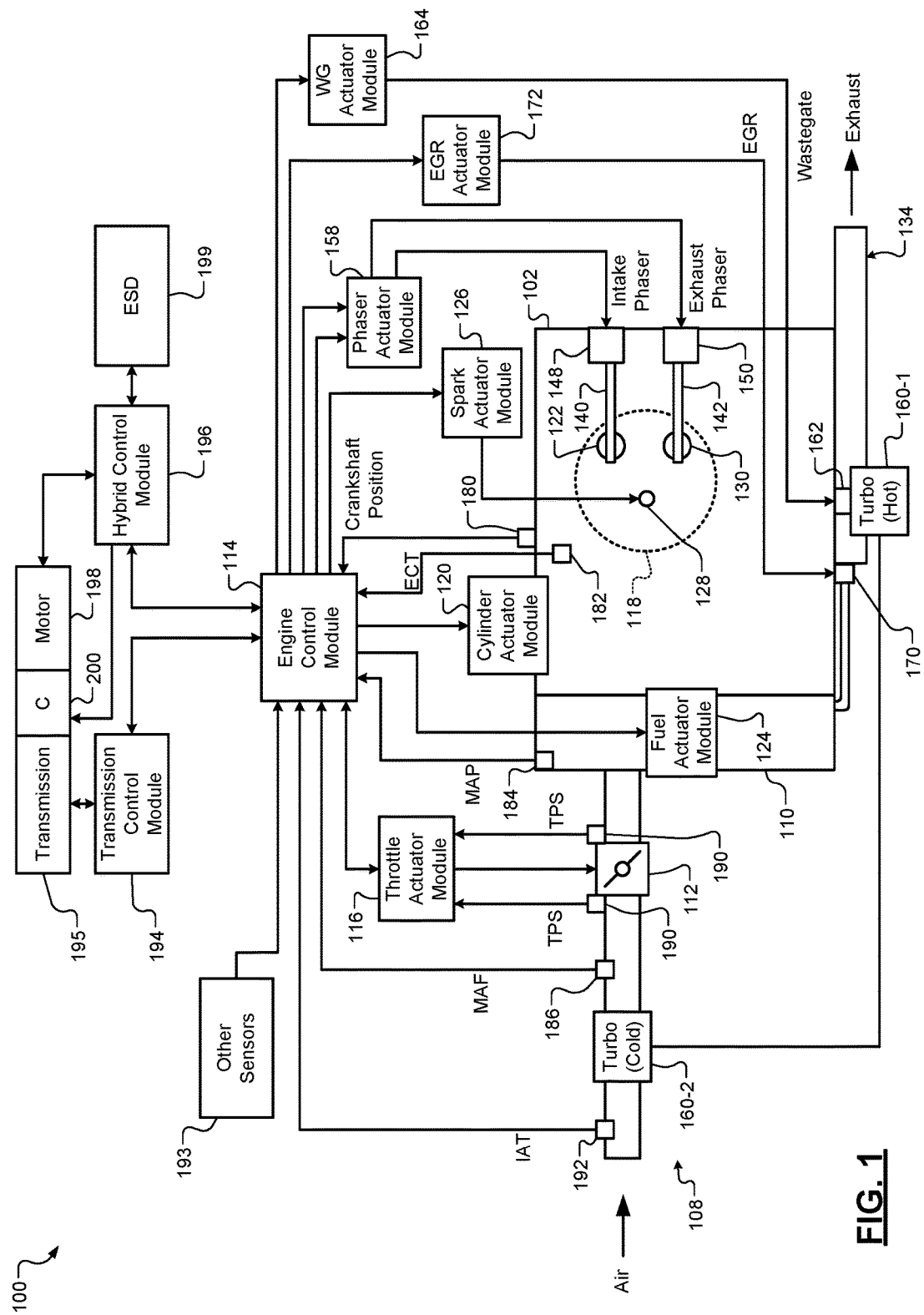
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from an energy storage device (ESD) 199 to the electric motor 198 to cause the electric motor 198 to output positive torque. The ESD 199 may include, for example, one or more batteries. The ESD 199 may be dedicated for power flow to and from the electric motor 198, and one or more other batteries or energy storage devices may supply power for other vehicle functions.

The electric motor 198 may output torque, for example, to an input shaft of the transmission 195 or to an output shaft of the transmission 195. A clutch 200 is engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The hybrid control module 196 may also selectively convert mechanical energy of the vehicle into electrical energy. More specifically, the electric motor 198 generates and outputs power via back EMF when the electric motor 198 is being driven by the transmission 195 and the hybrid control module 196 is not applying power to the electric motor 198 from the ESD 199. The hybrid control module 196 may charge the ESD 199 via the power output by the electric motor 198. This may be referred to as regeneration.

Figure 2:
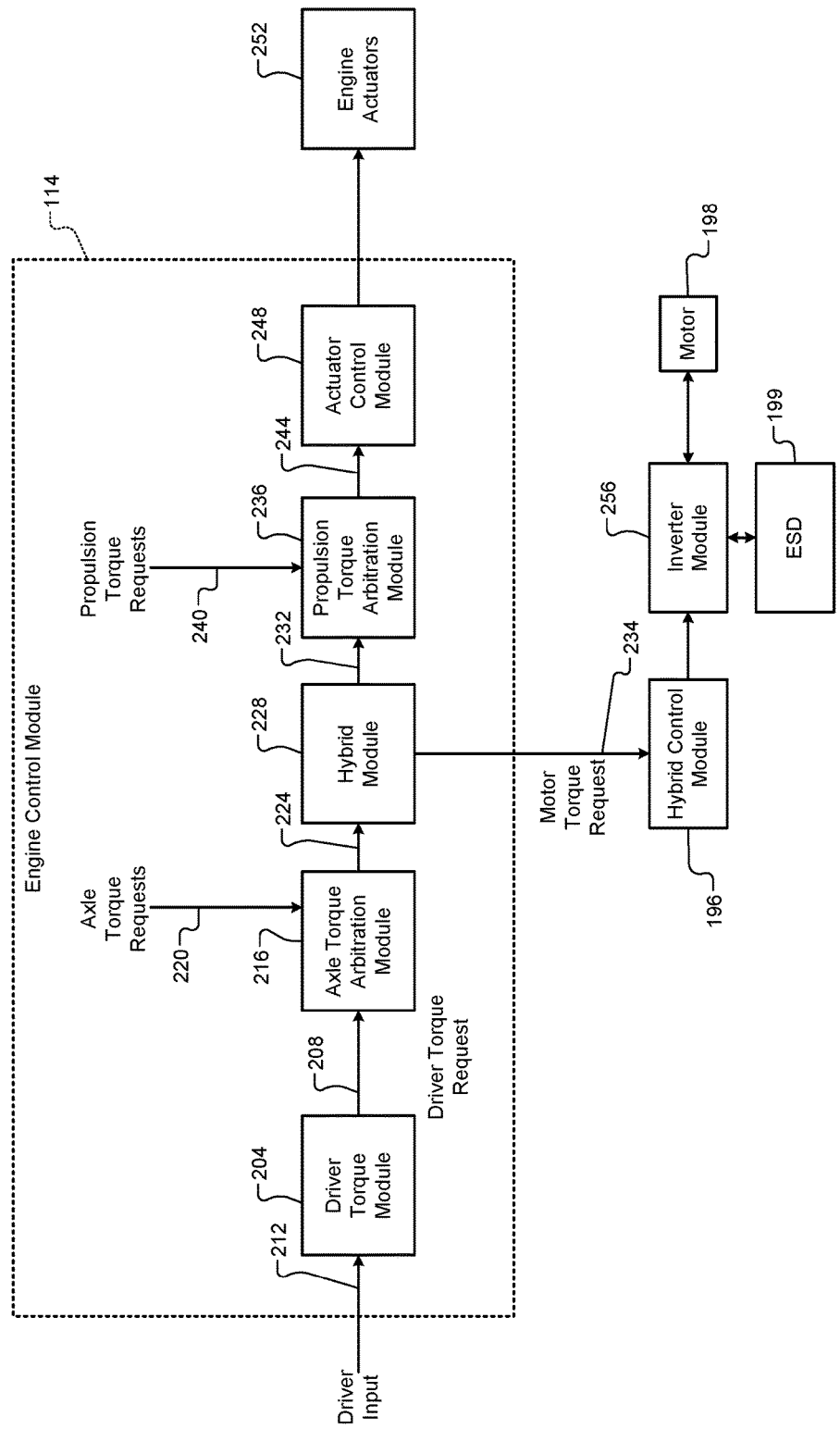
FIG. 2 is a functional block diagram of an example engine and motor control system.

Referring now to FIG. 2, a functional block diagram of an example engine control system is presented. The ECM 114 includes a driver torque module 204 that determines a driver torque request 208 based on driver input 212. The driver input 212 may include, for example, an accelerator pedal position (APP), a brake pedal position (BPP), and/or cruise control input. In various implementations, the cruise control input may be provided by an adaptive cruise control system that attempts to maintain at least a predetermined distance between the vehicle and objects in a path of the vehicle. The driver torque module 204 determine the driver torque request 208 based on one or more lookup tables that relate the driver inputs to driver torque requests. The APP and BPP may be measured using one or more APP sensors and BPP sensors, respectively.

The driver torque request 208 is an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle over-speed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

A hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102. The hybrid module 228 also outputs a motor torque request 234 to the hybrid control module 196. The motor torque request 234 indicates a requested torque output (positive or negative) of the electric motor 198. In vehicles where the engine 102 is omitted or is not connected to output propulsion torque for the vehicle, the axle torque arbitration module 216 may output one axle torque request and the motor torque request 234 may be equal to that axle torque request.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. Based on the propulsion torque requests 244, the actuator control module 248 may control opening of the throttle valve 112, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of the EGR valve 170, and/or one or more other engine actuators. In various implementations, the propulsion torque requests 244 may be adjusted or modified before use by the actuator control module 248, such as to create a torque reserve.

The hybrid control module 196 controls switching of an inverter module 256 based on the motor torque request 234. Switching of the inverter module 256 controls power flow from the ESD 199 to the electric motor 198. As such, switching of the inverter module 256 controls torque of the electric motor 198. The inverter module 256 also converts power generated by the electric motor 198 and outputs power to the ESD 199, for example, to charge the ESD 199.

The inverter module 256 includes a plurality of switches. The switches are switched to convert DC power from the ESD 199 into alternating current (AC) power and apply the AC power to the electric motor 198 to drive the electric motor 198. For example, the inverter module 256 may convert the DC power from the ESD 199 into 3-phase AC power and apply the 3-phase AC power to (e.g., a, b, and c or u, v, and w) stator windings of the electric motor 198. Magnetic flux produced via current flow through the stator windings drives a rotor of the electric motor 198. The rotor is connected to and drives rotation of an output shaft of the electric motor 198.

In various implementations, one or more filters may be electrically connected between the inverter module 256 and the ESD 199. The one or more filters may be implemented, for example, to filter power flow to and from the ESD 199. As an example, a filter including one or more capacitors and resistors may be electrically connected in parallel with the inverter module 256 and the ESD 199.

Figure 3:
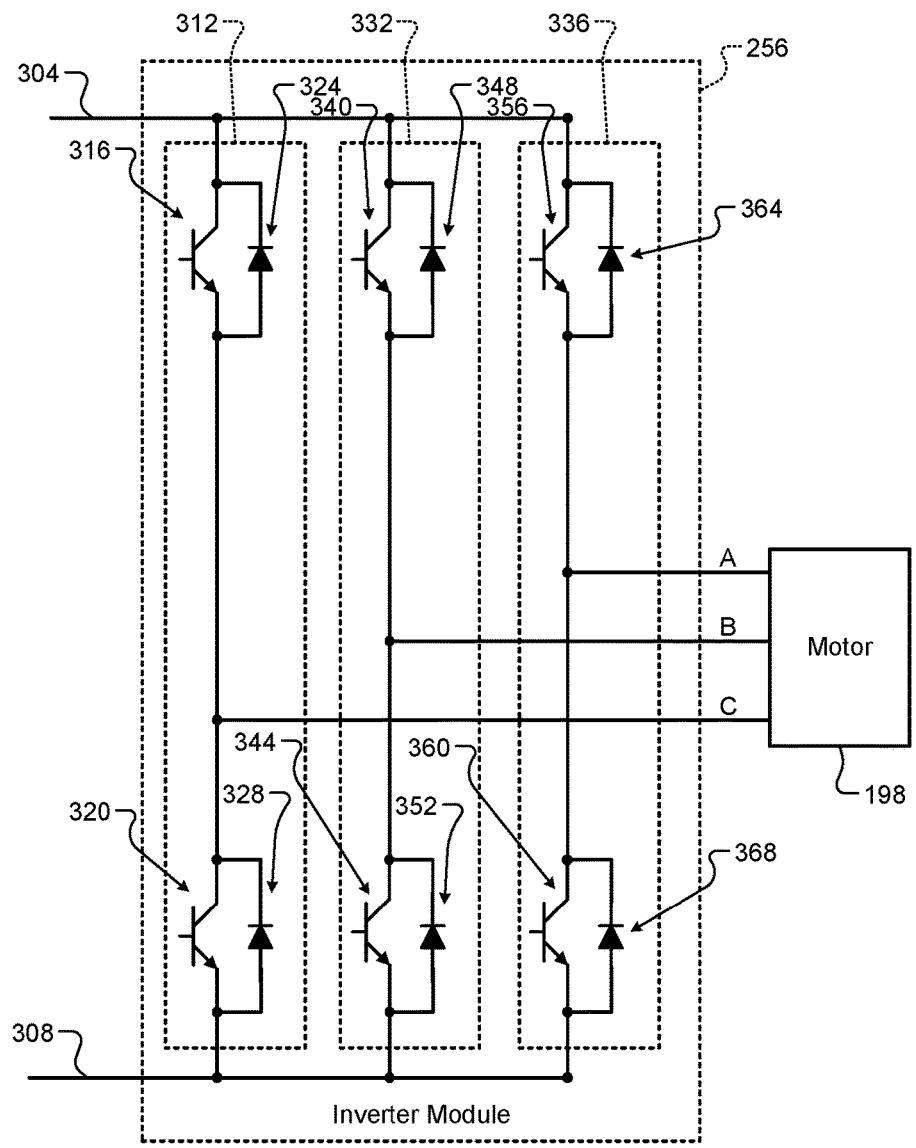
FIG. 3 is a schematic including an example implementation of an inverter module.

FIG. 3 includes a schematic including an example implementation of the inverter module 256. High (positive) and low (negative) sides 304 and 308 are connected to positive and negative terminals, respectively, of the ESD 199. The inverter module 256 is also connected between the high and low sides 304 and 308.

The inverter module 256 includes three legs, one leg connected to each phase of the electric motor 198. A first leg 312 includes first and second switches 316 and 320. The switches 316 and 320 each include a first terminal, a second terminal, and a control terminal. Each of the switches 316 and 320 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 316 is connected to the high side 304. The second terminal of the first switch 316 is connected to the first terminal of the second switch 320. The second terminal of the second switch 320 may be connected to the low side 308. A node connected to the second terminal of the first switch 316 and the first terminal of the second switch 320 is connected to a first phase (e.g., a) of the electric motor 198.

The first leg 312 also includes first and second diodes 324 and 328 connected anti-parallel to the switches 316 and 320, respectively. In other words, an anode of the first diode 324 is connected to the second terminal of the first switch 316, and a cathode of the first diode 324 is connected to the first terminal of the first switch 316. An anode of the second diode 328 is connected to the second terminal of the second switch 320, and a cathode of the second diode 328 is connected to the first terminal of the second switch 320. When the switches 316 and 320 are off (and open), power generated by the electric motor 198 is transferred through the diodes 324 and 328 when the output voltage of the electric motor 198 is greater than the voltage of the ESD 199. This charges the ESD 199. The diodes 324 and 328 form one phase of a three-phase rectifier.

The inverter module 256 also includes second and third legs 332 and 336. The second and third legs 332 and 336 may be (circuitry wise) similar or identical to the first leg 312. In other words, the second and third legs 332 and 336 may each include respective switches and diodes like the switches 316 and 320 and the diodes 324 and 328, connected in the same manner as the first leg 312. For example, the second leg 332 includes switches 340 and 344 and anti-parallel diodes 348 and 352. A node connected to the second terminal of the switch 340 and the first terminal of the switch 344 is connected to a second stator winding (e.g., b) of the electric motor 198. The third leg 336 includes switches 356 and 360 and anti-parallel diodes 364 and 368. A node connected to the second terminal of the switch 356 and the first terminal of the switch 360 is connected to a third stator winding (e.g., c) of the electric motor 198.

Figure 4:
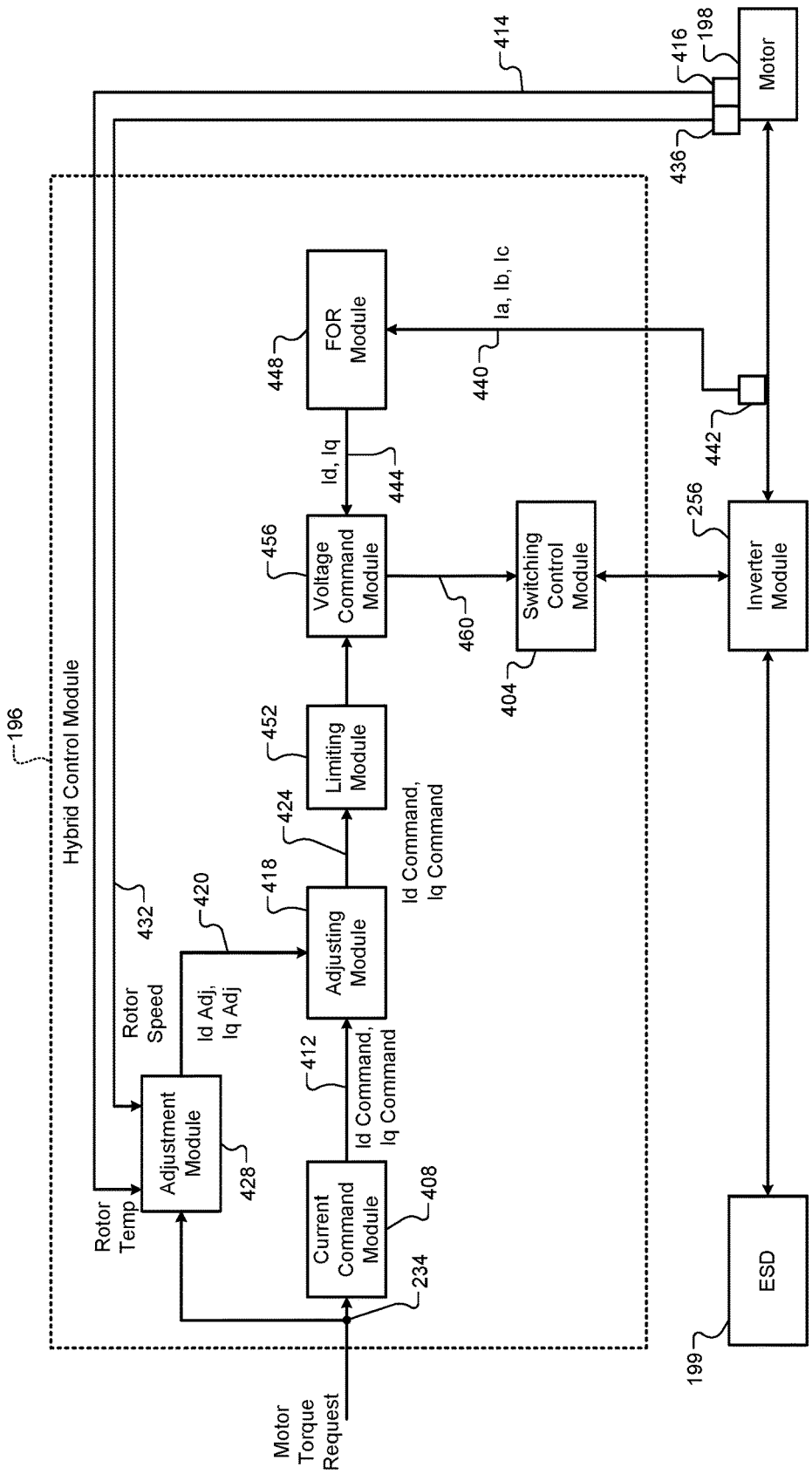
FIG. 4 is a functional block diagram including an example implementation of a hybrid control module.

FIG. 4 is a functional block diagram including an example implementation of the hybrid control module 196. A switching control module 404 controls switching of the switches 316 and 320 using pulse width modulation (PWM) signals. For example, the switching control module 404 may apply PWM signals to the control terminals of the switches 316, 320, 340, 344, 356, and 360. When on, power flows from the ESD 199 to the electric motor 198 to drive the electric motor 198.

For example, the switching control module 404 may apply generally complementary PWM signals to the control terminals of the switches 316 and 320 when applying power from the ESD 199 to the electric motor 198. In other words, the PWM signal applied to the control terminal of the first switch 316 is opposite in polarity to the PWM signal applied to the control terminal of the second switch 320. Short circuit current may flow, however, when the turning on of one of the switches 316 and 320 overlaps with the turning off of the other of the switches 316 and 320. As such, the switching control module 404 may generate the PWM signals to turn both of the switches 316 and 320 off during a deadtime period before turning either one of the switches 316 and 320 on. With this in mind, generally complementary may mean that two signals have opposite polarities for a majority of their periods when power is being output to the electric motor 198. Around transitions, however, both PWM signals may have the same polarity (off) for some overlap deadtime period.

The PWM signals provided to the switches of the second and third legs 332 and 336 may also be generally complementary per leg. The PWM signals provided to the second and third legs 332 and 336 may be phase shifted from each other and from the PWM signals provided to the switches 316 and 320 of the first leg 312. For example, the PWM signals for each leg may be phase shifted from each other leg by 120° (360°/3 legs=120° shift per leg). In this way, the currents through the stator windings (phases) of the electric motor 198 are phase shifted by 120° from each other.

A current command module 408 determines a first d-axis current command (Id Command) and a first q-axis current command (Iq Command) for the electric motor 198 based on the motor torque request 234. The first d-axis current command and the first q-axis current command are collectively illustrated by 412. The current command module 408 determines the first d-axis current command and the first q-axis current command using one or more equations and/or lookup tables that relate torques (e.g., torque requests or commands) to d and q-axis current commands.

Torque output of the electric motor 198, however, varies as a temperature of the rotor of the electric motor 198 varies. For example, under the same conditions, torque output of the electric motor 198 may decrease as the temperature of the rotor increases and vice versa. The relationship between rotor temperature and torque output may be linear or non-linear. Under some torque and speed conditions, the hybrid control module 196 selectively adjusts at least one of the first d-axis current command and the first q-axis current command based on a rotor temperature 414 of the electric motor 198. The rotor temperature 414 is a temperature of the rotor of the electric motor 198.

The rotor temperature 414 may be measured, for example, using a rotor temperature sensor 416. In various implementations, the rotor temperature 414 may be estimated by a rotor temperature estimation module. An example of estimation of the rotor temperature 414 can be found in commonly assigned U.S. Pat. No. 9,166,518, which is incorporated herein in its entirety.

An adjusting module 418 selectively adjusts the first d-axis current command and the first q-axis current command based on a d-axis current adjustment (Id Adj) and a q-axis current adjustment (Iq Adj), respectively. More specifically, the adjusting module 418 selectively adjusts the first d-axis current command based on the d-axis current adjustment to produce a second d-axis current command. The adjusting module 418 may, for example, set the second d-axis current demand based on or equal to one of (i) a sum of the first d-axis current demand and the d-axis current adjustment and (ii) the first d-axis current demand multiplied by the d-axis current adjustment. The adjusting module 418 selectively adjusts the first q-axis current command based on the q-axis current adjustment to produce a second q-axis current command. The adjusting module 418 may, for example, set the second q-axis current demand based on or equal to (i) a sum of the first q-axis current demand and the q-axis current adjustment or (ii) the first q-axis current demand multiplied by the q-axis current adjustment. The d-axis current adjustment and the q-axis current adjustment are collectively illustrated by 420. The second d-axis current command and the second q-axis current command are collectively illustrated by 424.

An adjustment module 428 determines the d-axis current adjustment and the q-axis current adjustment based on the rotor temperature 414, the motor torque request 234, and a rotor speed 432. The rotor speed 432 is a rotational speed of the rotor of the electric motor. The rotor speed 432 may be measured, for example, using a rotor speed sensor 436. In various implementations, the rotor speed 432 may be determined by a rotor speed module based on one or more other parameters, such change in position of the rotor over time where position is determined based on currents 440 (e.g., Ia, Ib, Ic) flow through the stator windings of the electric motor 198. Current sensors 442 may measure the currents 440.

Figure 5:
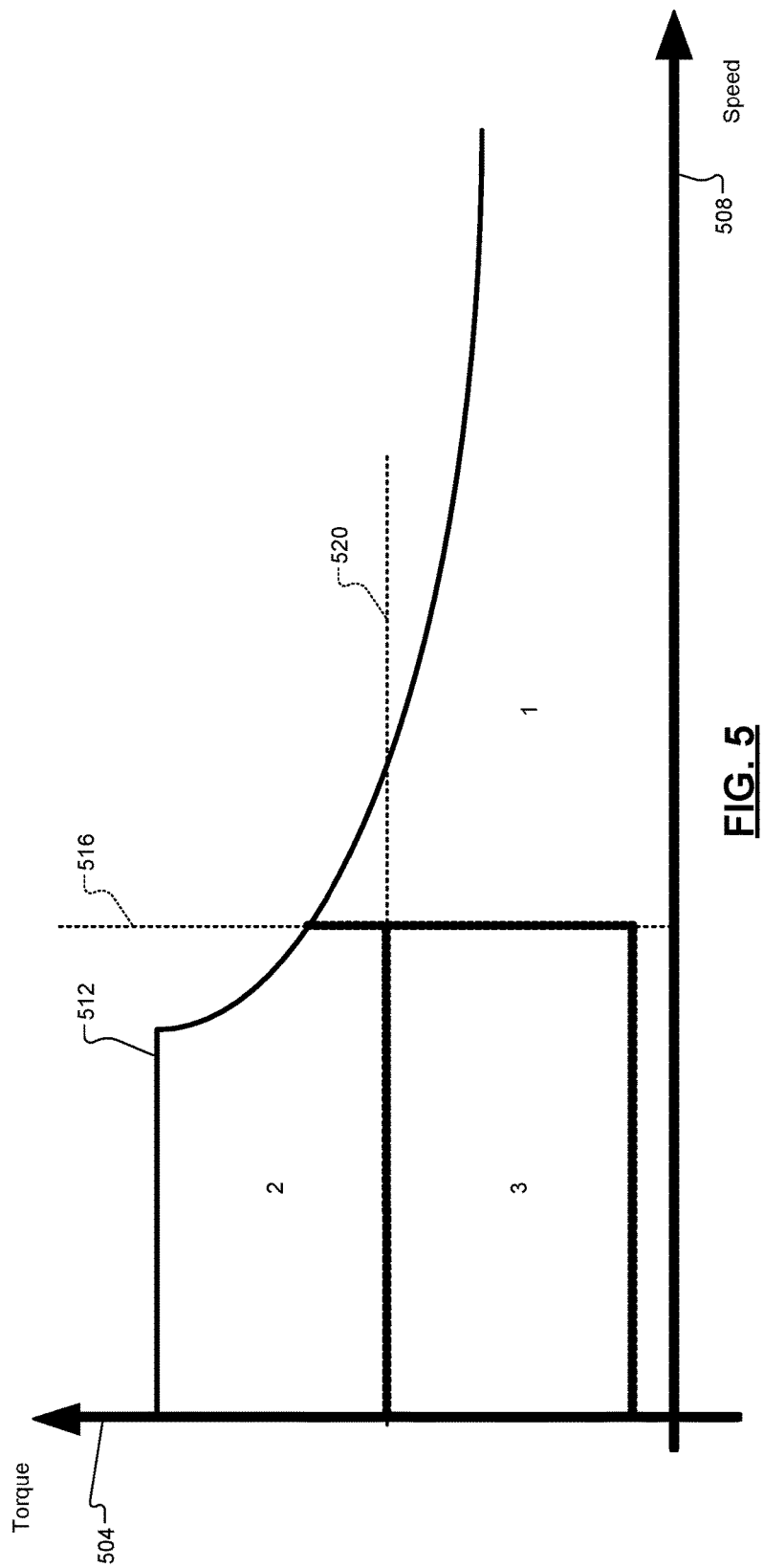
FIG. 5 is an example graph of torque versus speed for an electric motor.

FIG. 5 includes an example graph of torque 504 versus rotor speed 508. Trace 512 corresponds to a maximum torque output of the electric motor 198 at the given rotor speed. Referring now to FIGS. 4 and 5, when the rotor speed 432 is greater than a predetermined speed, the adjustment module 428 sets the d-axis current adjustment and the q-axis current adjustment to a predetermined non-adjusting value. The predetermined speed is greater than zero and may be calibrated based on a speed where a variation in torque output of the electric motor 198 with a predetermined rotor temperature variation is less than a predetermined value. An example predetermined speed is illustrated in FIG. 5 by 516.

The d-axis current adjustment being set to the predetermined non-adjusting value will cause the adjusting module 418 to set the second d-axis current command equal to the first d-axis current command. The q-axis current adjustment being set to the predetermined non-adjusting value will cause the adjusting module 418 to set the second q-axis current command equal to the first q-axis current command. For example only, the predetermined non-adjusting value may be 0.0 in the example of summation of the current adjustments with the first current commands and 1.0 in the example of multiplication of the current adjustments with the first current commands.

When the rotor speed 432 is less than the predetermined speed and the motor torque request 234 is greater than a predetermined torque, the adjustment module 428 determine the d-axis current adjustment based on the rotor temperature 414 and sets the q-axis current adjustment to the predetermined non-adjusting value. In this way, only the first d-axis current command will be adjusted. The predetermined torque is greater than zero and may be calibrated. An example predetermined torque is illustrated in FIG. 5 by 520.

The adjustment module 428 may determine the d-axis current adjustment using one or more equations and/or lookup tables that relate rotor temperatures to d-axis current adjustments. For example, the adjustment module 428 may set the d-axis current adjustment based on or equal to:

$$\frac{\Delta\lambda f}{Ld - Lq},$$

where $\Delta\lambda f$ is variation in the magnetic flux linkage of the electric motor 198, Ld is the d-axis inductance of the electric motor 198 and Lq is the q-axis inductance of the electric motor 198.

The variation in the magnetic flux linkage of the electric motor 198 may vary with the rotor temperature 414 and the adjustment module 428 may determine the variation in the magnetic flux linkage of the electric motor 198 based on the rotor temperature 414. For example, the adjustment module 428 may determine the variation in the magnetic flux linkage of the electric motor 198 using one or more equations and/or lookup tables that relate rotor temperatures to variation in the magnetic flux linkage. The adjustment module 428 may determine the d-axis inductance of the electric motor 198 and the q-axis inductance of the electric motor 198 based on d-axis current of the electric motor 198 and q-axis current of the electric motor 198. The d-axis current and the q-axis current are collectively illustrated by 444. A frame of reference (FOR) module 448 may transform the currents 440 into the d and q-axis currents by applying a Clarke transform and a Park transform.

When the rotor speed 432 is less than the predetermined speed and the motor torque request 234 is less than the predetermined torque, in various implementations, the adjustment module 428 may determine the q-axis current adjustment based on the rotor temperature 414 and set the d-axis current adjustment to the predetermined non-adjusting value. In this way, only the first q-axis current command will be adjusted. The adjustment module 428 may determine the q-axis current adjustment using one or more equations and/or lookup tables that relate rotor temperatures to q-axis current adjustments. For example, the adjustment module 428 may set the q-axis current adjustment based on or equal to:

$$\frac{\Delta\lambda f}{(Ld - Lq) * IdCom + \lambda f + \Delta\lambda f} * IqCom,$$

where $\Delta\lambda f$ is variation in the magnetic flux linkage of the electric motor 198, Ld is the d-axis inductance of the electric motor 198, Lq is the q-axis inductance of the electric motor 198, IdCom is the first d-axis current command, IqCom is the first q-axis current command, and $\lambda f$ is the magnetic flux linkage of the electric motor 198. The magnetic flux linkage of the electric motor 198 may vary with the rotor temperature 414 and the adjustment module 428 may determine the magnetic flux linkage of the electric motor 198 based on the rotor temperature 414. For example, the adjustment module 428 may determine the magnetic flux linkage of the electric motor 198 using one or more equations and/or lookup tables that relate rotor temperatures to magnetic flux linkages.

In various implementations, when the rotor speed 432 is less than the predetermined speed and the motor torque request 234 is less than the predetermined torque, the adjustment module 428 may determine the q-axis current adjustment based on the rotor temperature 414 and set the d-axis current adjustment based on the rotor temperature 414. In this way, both the first q-axis current command and the first d-axis current command will be adjusted. The adjustment module 428 may determine the q-axis current adjustment using one or more equations and/or lookup tables that relate rotor temperatures to q-axis current adjustments and one or more equations and/or lookup tables that relate rotor temperatures to d-axis current adjustments. For example, the adjustment module 428 may set the d-axis current adjustment based on or equal to:

K*(Ld−Lq)*IqCom, where K is a predetermined gain value, Ld is the d-axis inductance of the electric motor 198, Lq is the q-axis inductance of the electric motor 198, and IqCom is the first q-axis current command. The adjustment module 428 may set the q-axis current adjustment based on or equal to:

K*[(Ld−Lq)*IdCom+λf+Δλf], where K is a predetermined gain value, Ld is the d-axis inductance of the electric motor 198, Lq is the q-axis inductance of the electric motor 198, Δλf is variation in the magnetic flux linkage of the electric motor 198, IdCom is the first d-axis current command, and λf is the magnetic flux linkage of the electric motor 198.

A limiting module 452 limits the second d-axis current command and the second q-axis current command to within a predetermined current range bounded by a predetermined maximum current and a predetermined minimum current (e.g., 0). A voltage command module 456 determines voltage commands 460 for voltages to apply to the stator windings based on the second d-axis current command and the second q-axis current command and the d and q-axis currents 444. The voltage command module 456 may determine the voltage commands 460 using one or more equations and/or lookup tables that relate d and q axis current commands and d and q-axis currents to voltage commands. In various implementations, the voltage command module 456 may generate the voltage commands 460 using closed-loop control to adjust the d and q-axis currents 444 toward or two the second d and q-axis current commands, respectively.

The switching control module 404 determines duty cycles of the PWM signals to apply to the stator windings based on the respective voltage commands for the stator windings. For example, the switching control module 404 may determine the duty cycles using one or more equations or lookup tables that relate voltage commands to PWM duty cycles.

Figure 6:
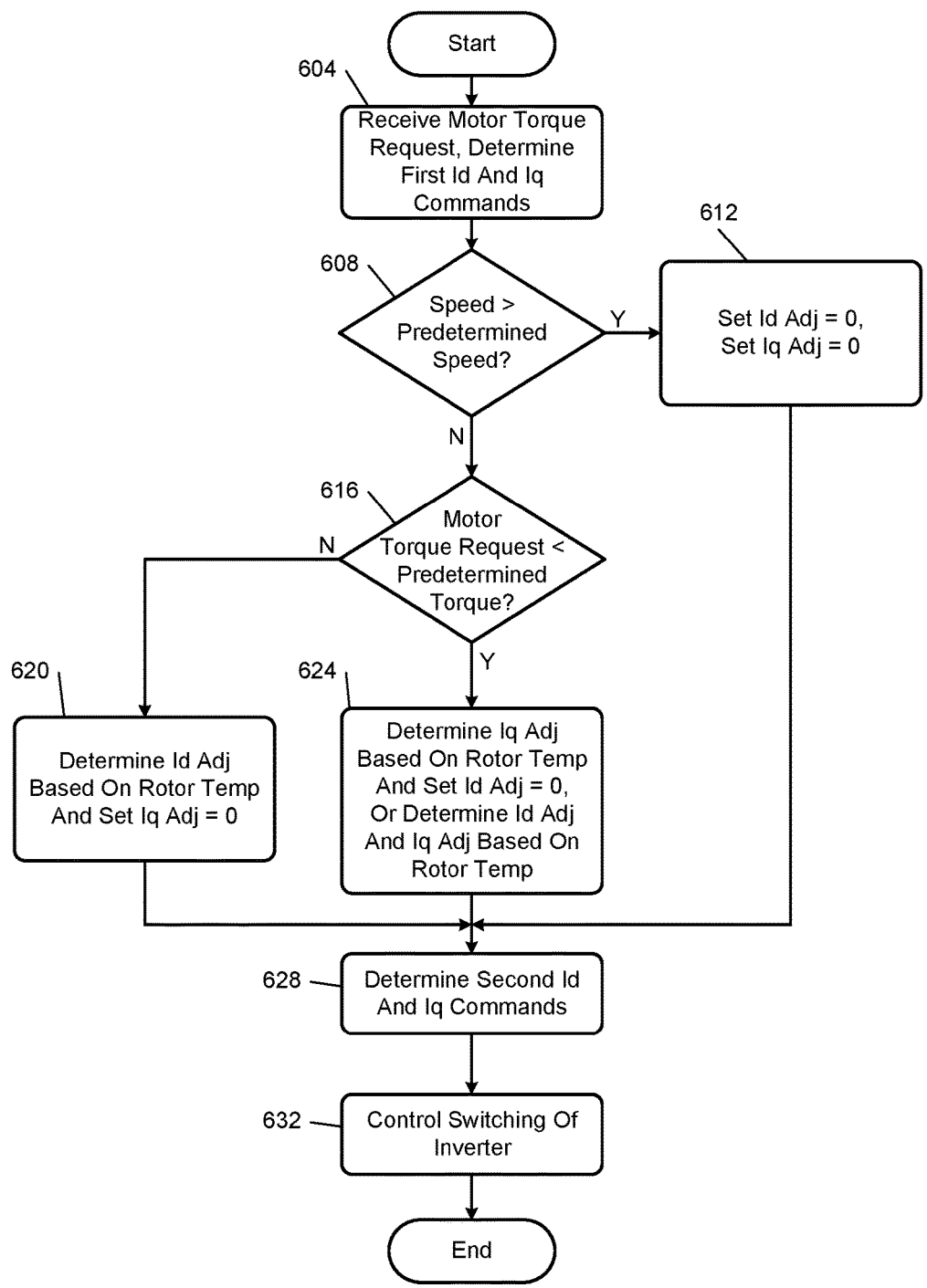
FIG. 6 is a flowchart including an example method of controlling an electric motor.

FIG. 6 is a flowchart depicting an example method of controlling the electric motor 198 based on the rotor temperature 414. Control begins with 604 where the current command module 408 receives the motor torque request 234 and determines the first d-axis current command the first q-axis current command based on the motor torque request 234. At 608, the adjustment module 428 determines whether the rotor speed 432 is greater than the predetermined speed. If 608 is true, the adjustment module 428 sets the d and q-axis current adjustments to the predetermined non-adjusting value at 612, and control continues with 628. 628 is discussed further below. If 608 is false, control continues with 616.

At 616, the adjustment module 428 determines whether the motor torque request 234 is less than the predetermined torque. If 616 is false, at 620 the adjustment module 428 sets the q-axis current adjustment to the predetermined non-adjusting value and determines the d-axis current adjustment based on the rotor temperature 414 and control continues with 628. For example, the adjustment module 428 may set the d-axis current adjustment based on or equal to:

$$\frac{\Delta \lambda f}{Ld - Lq},$$

where Δλf is variation in the magnetic flux linkage of the electric motor 198 and is determined based on the rotor temperature 414, Ld is the d-axis inductance of the electric motor 198, and Lq is the q-axis inductance of the electric motor 198. If 616 is true, control continues with 624.

The adjustment module 428 may determine the q-axis current adjustment based on the rotor temperature 414 and set the d-axis current adjustment to the predetermined non-adjusting value at 624. For example, the adjustment module 428 may set the q-axis current adjustment based on or equal to:

$$\frac{\Delta \lambda f}{(Ld - Lq) * IdCom + \lambda f + \Delta \lambda f} * IqCom,$$

where Δλf is variation in the magnetic flux linkage of the electric motor 198, Ld is the d-axis inductance of the electric motor 198, Lq is the q-axis inductance of the electric motor 198, IdCom is the first d-axis current command, IqCom is the first q-axis current command, and λf is the magnetic flux linkage of the electric motor 198. The adjustment module 428 determines the magnetic flux linkage and the variation in the magnetic flux linkage based on the rotor temperature 414.

Alternatively, the adjustment module 428 may determine the q-axis current adjustment based on the rotor temperature 414 at 624 and also determine the d-axis current adjustment. For example, the adjustment module 428 may set the d-axis current adjustment based on or equal to:

K*(Ld−Lq)*IqCom, where K is a predetermined gain value, Ld is the d-axis inductance of the electric motor 198, Lq is the q-axis inductance of the electric motor 198, and IqCom is the first q-axis current command. The adjustment module 428 may set the q-axis current adjustment based on or equal to:

K*[(Ld−Lq)*IdCom+λf+Δλf], where K is a predetermined gain value, Ld is the d-axis inductance of the electric motor 198, Lq is the q-axis inductance of the electric motor 198, Δλf is variation in the magnetic flux linkage of the electric motor 198, IdCom is the first d-axis current command, and λf is the magnetic flux linkage of the electric motor 198. The adjustment module 428 determines the magnetic flux linkage and the variation in the magnetic flux linkage based on the rotor temperature 414.

The adjusting module 418 selectively adjusts the first d and q-axis current commands based on the d and q-axis current adjustments to produce the second d and q-axis current commands, respectively, at 628. For example only, the adjusting module 418 may set the second d-axis current command based on or equal to (i) the sum of the first d-axis current command and the d-axis current adjustment or to (ii) the first d-axis current command multiplied by the d-axis current adjustment. The adjusting module 418 may set the second q-axis current command based on or equal to (i) the sum of the first q-axis current command and the q-axis current adjustment or to (ii) the first q-axis current command multiplied by the q-axis current adjustment. The adjustment based on the d and/or q-axis current adjustments accounts for change in torque output of the electric motor 198 that may be attributable to the rotor temperature 414 and causes the actual torque output of the electric motor 198 to be closer to the motor torque request 234.

At 632, the switching control module 404 controls switching of the switches of the inverter module 256 to achieve the second d and q-axis current commands. For example, the voltage command module 456 may determine the voltage commands 460 based on the second d and q-axis current commands and determine duty cycles of PWM signals to apply to the switches of the inverter module 256 to apply the voltage commands 460 to the respective stator windings. In various implementations, the limiting module 452 may limit the second d and q-axis current commands before they are used by the voltage command module 456.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An electric motor control system of a vehicle, comprising:
 a current command module configured to, based on a motor torque request for an electric motor of the vehicle, generate a first d-axis current command for the electric motor and a first q-axis current command for the electric motor;
 an adjustment module configured to, based on a speed of a rotor of the electric motor and the motor torque request, selectively determine at least one of a d-axis current adjustment and a q-axis current adjustment based on a temperature of the rotor of the electric motor;
 an adjusting module configured to produce a second d-axis current command for the electric motor by adjusting the first d-axis current command based on the d-axis current adjustment and to produce a second q-axis current command for the electric motor by adjusting the first q-axis current command based on the q-axis current adjustment; and
 a switching control module configured to, based on the second d-axis current command and the second q-axis current command, control switching of an inverter module and apply power to stator windings of the electric motor from an energy storage device,
 wherein:
  the adjustment module is configured to:
   when the speed is greater than a predetermined speed, set both the d-axis current adjustment and the q-axis current adjustment to a predetermined value; and
   when the speed is less than the predetermined speed, based on whether the motor torque request is greater than a predetermined torque, selectively determine one of the d-axis current adjustment and the q-axis current adjustment based on the temperature of the rotor of the electric motor; and
  the adjusting module is configured to:
   based on the d-axis current adjustment being equal to the predetermined value, set the second d-axis current command equal to the first d-axis current command; and
   based on the q-axis current adjustment being equal to the predetermined value, set the second q-axis current command equal to the first q-axis current command,
  wherein the adjusting module is configured to:
   one of:
    set the second d-axis current command equal to the first d-axis current command plus the d-axis current adjustment; and
    set the second d-axis current command equal to the first d-axis current command multiplied by the d-axis current adjustment; and
   one of:
    set the second q-axis current command equal to the first q-axis current command plus the q-axis current adjustment; and
    set the second d-axis current command equal to the first q-axis current command multiplied by the q-axis current adjustment.

2. The electric motor control system of claim 1 wherein the adjustment module is configured to:
 when the speed is less than the predetermined speed and the motor torque request is greater than the predetermined torque, determine the d-axis current adjustment based on the temperature of the rotor of the electric motor; and
 when the speed is less than the predetermined speed and the motor torque request is less than the predetermined torque, determine the q-axis current adjustment based on the temperature of the rotor of the electric motor.

3. The electric motor control system of claim 2 wherein the adjustment module is further configured to, when the speed is less than the predetermined speed and the motor torque request is greater than the predetermined torque, set the q-axis current adjustment to the predetermined value.

4. The electric motor control system of claim 2 wherein the adjustment module is further configured to, when the speed is less than the predetermined speed and the motor torque request is less than the predetermined torque, set the d-axis current adjustment to the predetermined value.

5. The electric motor control system of claim 2 wherein the adjustment module is further configured to, when the speed is less than the predetermined speed and the motor torque request is less than the predetermined torque, determine the d-axis current adjustment based on the first d-axis current command, a d-axis inductance of the electric motor, a q-axis inductance of the electric motor, and a predetermined gain.

6. The electric motor control system of claim 2 wherein the adjustment module is configured to, when the speed is less than the predetermined speed and the motor torque request is less than the predetermined torque:
 determine a magnetic flux linkage of the electric motor based on the temperature of the rotor;
 determine a variation in the magnetic flux linkage based on the temperature of the rotor; and determine the q-axis current adjustment based on the magnetic flux linkage and the variation in the magnetic flux linkage.

7. The electric motor control system of claim 2 wherein the adjustment module is configured to, when the speed is less than the predetermined speed and the motor torque request is greater than the predetermined torque:
  determine a variation in magnetic flux linkage of the electric motor based on the temperature of the rotor; and
  determine the d-axis current adjustment based on the variation in the magnetic flux linkage, a d-axis inductance of the electric motor, and a q-axis inductance of the electric motor.

8. An electric motor control method for a vehicle, comprising:
  based on a motor torque request for an electric motor of the vehicle, generating a first d-axis current command for an electric motor of the vehicle and a first q-axis current command for the electric motor;
  based on a speed of a rotor of the electric motor and the motor torque request, selectively determining at least one of a d-axis current adjustment and a q-axis current adjustment based on a temperature of the rotor of the electric motor;
  producing a second d-axis current command for the electric motor by adjusting the first d-axis current command based on the d-axis current adjustment;
  producing a second q-axis current command for the electric motor by adjusting the first q-axis current command based on the q-axis current adjustment; and
  based on the second d-axis current command and the second q-axis current command, controlling switching of an inverter module and applying power to stator windings of the electric motor from an energy storage device,
  wherein:
    selectively determining at least one of the d-axis current adjustment and the q-axis current adjustment includes:
      when the speed is greater than a predetermined speed, setting both the d-axis current adjustment and the q-axis current adjustment to a predetermined value; and
      when the speed is less than the predetermined speed, based on whether the motor torque request is greater than a predetermined torque, selectively determining one of the d-axis current adjustment and the q-axis current adjustment based on the temperature of the rotor of the electric motor; and
    producing the second d-axis current command includes, based on the d-axis current adjustment being equal to the predetermined value, setting the second d-axis current command equal to the first d-axis current command; and
    producing the second q-axis current command includes, based on the q-axis current adjustment being equal to the predetermined value, setting the second q-axis current command equal to the first q-axis current command, and
  wherein:
    one of:
      producing the second d-axis current command includes setting the second d-axis current command equal to the first d-axis current command plus the d-axis current adjustment; and
      producing the second d-axis current command includes setting the second d-axis current command equal to the first d-axis current command multiplied by the d-axis current adjustment; and
    one of:
      producing the second q-axis current command includes setting the second q-axis current command equal to the first q-axis current command plus the q-axis current adjustment; and
      producing the second q-axis current command includes setting the second d-axis current command equal to the first q-axis current command multiplied by the q-axis current adjustment.

9. The electric motor control method of claim 8 wherein selectively determining at least one of the d-axis current adjustment and the q-axis current adjustment includes:
  when the speed is less than the predetermined speed and the motor torque request is greater than the predetermined torque, determining the d-axis current adjustment based on the temperature of the rotor of the electric motor; and
  when the speed is less than the predetermined speed and the motor torque request is less than the predetermined torque, determining the q-axis current adjustment based on the temperature of the rotor of the electric motor.

10. The electric motor control method of claim 9 selectively determining at least one of the d-axis current adjustment and the q-axis current adjustment includes, when the speed is less than the predetermined speed and the motor torque request is greater than the predetermined torque, setting the q-axis current adjustment to the predetermined value.

11. The electric motor control method of claim 9 wherein selectively determining at least one of the d-axis current adjustment and the q-axis current adjustment includes, when the speed is less than the predetermined speed and the motor torque request is less than the predetermined torque, setting the d-axis current adjustment to the predetermined value.

12. The electric motor control method of claim 9 wherein selectively determining at least one of the d-axis current adjustment and the q-axis current adjustment includes, when the speed is less than the predetermined speed and the motor torque request is less than the predetermined torque, determining the d-axis current adjustment based on the first d-axis current command, a d-axis inductance of the electric motor, a q-axis inductance of the electric motor, and a predetermined gain.

13. The electric motor control method of claim 9 wherein selectively determining at least one of the d-axis current adjustment and the q-axis current adjustment includes, when the speed is less than the predetermined speed and the motor torque request is less than the predetermined torque:
  determining a magnetic flux linkage of the electric motor based on the temperature of the rotor;
  determining a variation in the magnetic flux linkage based on the temperature of the rotor; and
  determining the q-axis current adjustment based on the magnetic flux linkage and the variation in the magnetic flux linkage.

14. The electric motor control method of claim 9 wherein selectively determining at least one of the d-axis current adjustment and the q-axis current adjustment includes, when the speed is less than the predetermined speed and the motor torque request is greater than the predetermined torque:
  determining a variation in magnetic flux linkage of the electric motor based on the temperature of the rotor; and determining the d-axis current adjustment based on the variation in the magnetic flux linkage, a d-axis inductance of the electric motor, and a q-axis inductance of the electric motor.

15. An electric motor control system of a vehicle, comprising:
a current command module configured to, based on a motor torque request for an electric motor of the vehicle, generate a first d-axis current command for the electric motor and a first q-axis current command for the electric motor;
an adjustment module configured to, based on a speed of a rotor of the electric motor and the motor torque request, selectively determine at least one of a d-axis current adjustment and a q-axis current adjustment based on a temperature of the rotor of the electric motor;
an adjusting module configured to produce a second d-axis current command for the electric motor by adjusting the first d-axis current command based on the d-axis current adjustment and to produce a second q-axis current command for the electric motor by adjusting the first q-axis current command based on the q-axis current adjustment; and
a switching control module configured to, based on the second d-axis current command and the second q-axis current command, control switching of an inverter module and apply power to stator windings of the electric motor from an energy storage device,
wherein:
the adjustment module is configured to:
when the speed is greater than a predetermined speed, set both the d-axis current adjustment and the q-axis current adjustment to a predetermined value; and
when the speed is less than the predetermined speed, based on whether the motor torque request is greater than a predetermined torque, selectively determine one of the d-axis current adjustment and the q-axis current adjustment based on the temperature of the rotor of the electric motor; and
the adjusting module is configured to:
based on the d-axis current adjustment being equal to the predetermined value, set the second d-axis current command equal to the first d-axis current command; and
based on the q-axis current adjustment being equal to the predetermined value, set the second q-axis current command equal to the first q-axis current command.

16. An electric motor control method for a vehicle, comprising:
based on a motor torque request for an electric motor of the vehicle, generating a first d-axis current command for an electric motor of the vehicle and a first q-axis current command for the electric motor;
based on a speed of a rotor of the electric motor and the motor torque request, selectively determining at least one of a d-axis current adjustment and a q-axis current adjustment based on a temperature of the rotor of the electric motor;
producing a second d-axis current command for the electric motor by adjusting the first d-axis current command based on the d-axis current adjustment;
producing a second q-axis current command for the electric motor by adjusting the first q-axis current command based on the q-axis current adjustment; and
based on the second d-axis current command and the second q-axis current command, controlling switching of an inverter module and applying power to stator windings of the electric motor from an energy storage device,
wherein:
selectively determining at least one of the d-axis current adjustment and the q-axis current adjustment includes:
when the speed is greater than a predetermined speed, setting both the d-axis current adjustment and the q-axis current adjustment to a predetermined value; and
when the speed is less than the predetermined speed, based on whether the motor torque request is greater than a predetermined torque, selectively determining one of the d-axis current adjustment and the q-axis current adjustment based on the temperature of the rotor of the electric motor; and
producing the second d-axis current command includes, based on the d-axis current adjustment being equal to the predetermined value, setting the second d-axis current command equal to the first d-axis current command; and
producing the second q-axis current command includes, based on the q-axis current adjustment being equal to the predetermined value, setting the second q-axis current command equal to the first q-axis current command.

* * * * *